United States Patent [19]

Butler

[11] 4,231,503
[45] Nov. 4, 1980

[54] MICROTOMY KNIFE BREAKER

[76] Inventor: James K. Butler, 1412 Woodbine Crt., Arlington, Tex. 76012

[21] Appl. No.: 17,455

[22] Filed: Mar. 5, 1979

[51] Int. Cl.³ .............................................. C03B 33/02
[52] U.S. Cl. ...................................... 225/2; 225/96.5; 225/103
[58] Field of Search ......................... 225/2, 96.5, 103; 83/468

[56] References Cited

U.S. PATENT DOCUMENTS

| | | | |
|---|---|---|---|
| 222,080 | 11/1879 | Sanborn | 83/468 |
| 663,645 | 12/1900 | Strait | 83/468 X |
| 954,773 | 4/1910 | Armstrong | 225/104 |
| 2,354,323 | 7/1944 | Layton | 225/104 X |
| 2,460,205 | 1/1949 | Webster | 83/468 X |
| 3,371,833 | 3/1968 | Sutton | 225/2 |
| 3,494,521 | 2/1970 | Hellstrom | 225/96.5 |
| 3,908,878 | 9/1975 | Blum | 225/96.5 |
| 4,026,262 | 5/1977 | Yasuga | 225/96.5 X |
| 4,175,684 | 11/1979 | Butler | 225/2 |

*Primary Examiner*—Frank T. Yost
*Attorney, Agent, or Firm*—Charles W. McHugh; Charles W. McHugh

[57] ABSTRACT

A glass-breaking apparatus adapted for breaking microtome knives of the Ralph type, including a generally horizontal base having right and left upright posts which serve in the manner of vices or clamps. A rigid fulcrum in the form of a hardened and elongated member is fixed to the base at a central position between the two upright structures. A movable block is positioned at a desired location between the two upright posts in such a way that the block may affect the precise placement of a piece of glass in the apparatus—by virtue of pushing the glass rearwardly against the block. Index lines are provided on the vertical front face of the block, for use in manually aligning a score line on the top of the glass piece with a desired one of the index lines. The fulcrum is preferably removable and replaceable at will with a similar fulcrum of the same or a different length. Ideally, the fulcrum is selected so as to be significantly shorter than the width of the glass piece, so that there will be a minimum overhang of ⅛ of the glass width on each end of the fulcrum. When sufficient strain is thereafter imparted to the glass piece, it will fracture—beginning at the score line and traveling downward along a cleavage plane toward the fixed fulcrum. The intersection of the cleavage plane with the bottom surface of the glass produces a very sharp cutting edge.

13 Claims, 7 Drawing Figures

U.S. Patent  Nov. 4, 1980  4,231,503
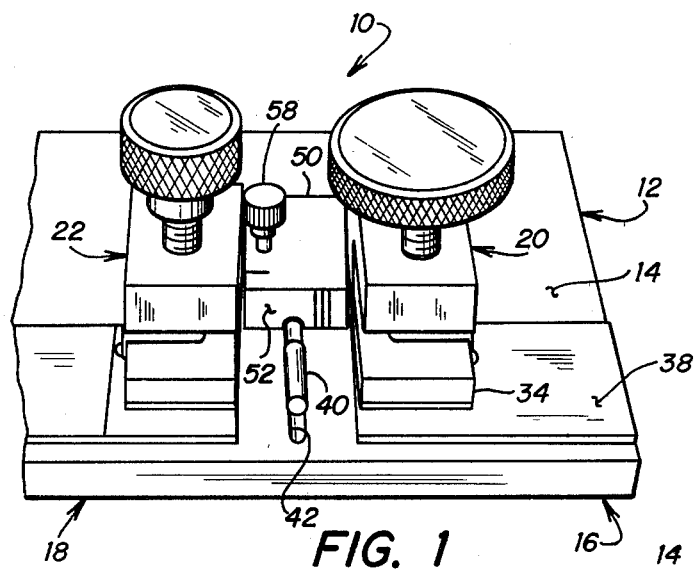
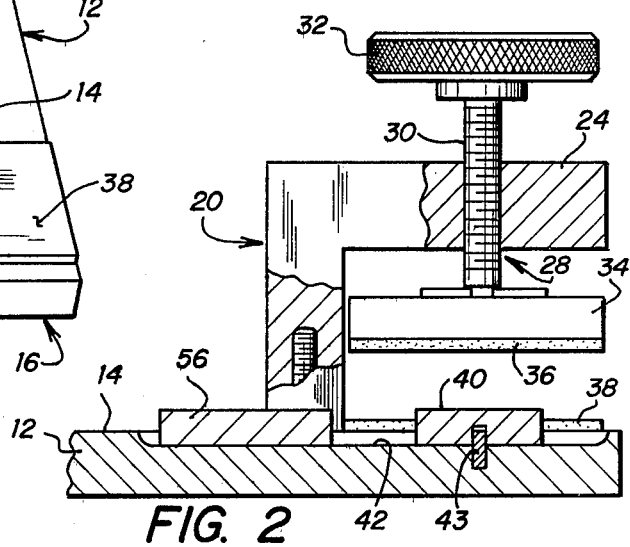
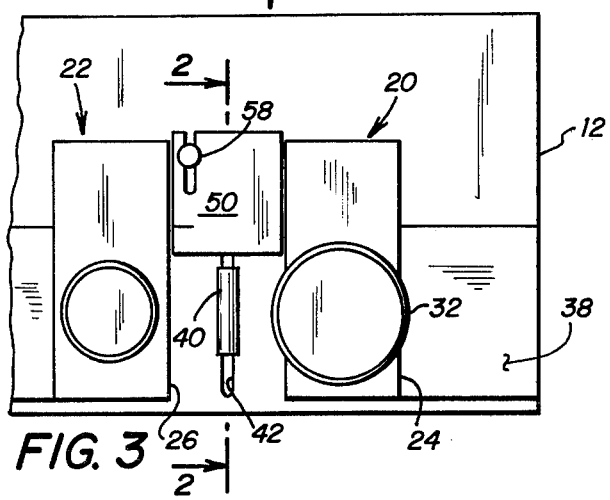
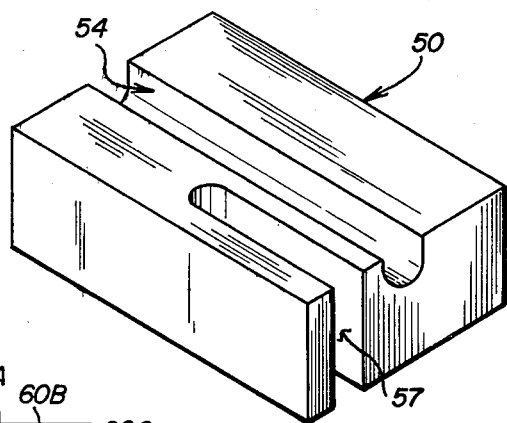
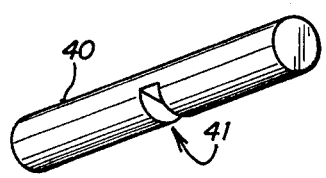
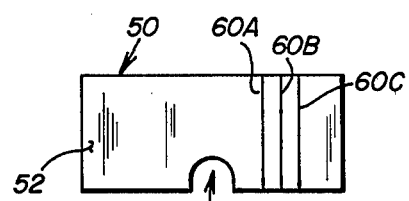
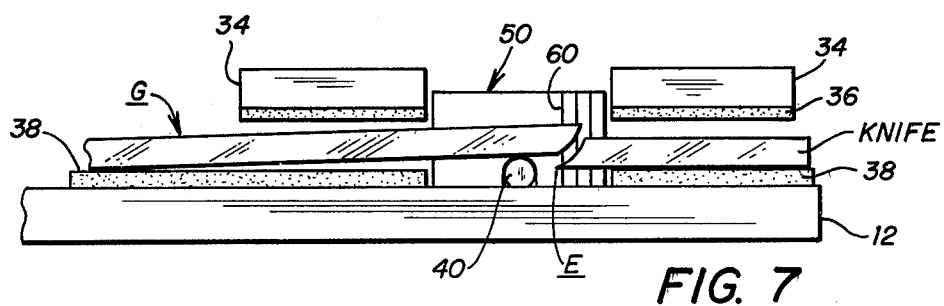

MICROTOMY KNIFE BREAKER

REFERENCE TO RELATED APPLICATION

The disclosure herein is related to application Ser. No. 929,856 filed July 31, 1978 entitled "Mechanical Glass Knife Scorer/Breaker", by the same inventor of the instant device, now U.S. Pat. No. 4,175,684.

This invention relates generally to the field of controlled breakage of a glass plate in order to produce a very sharp edge; more particularly, it relates to the production of Ralph-type knives for use in microtomy.

DESCRIPTION OF PRIOR ART

In 1950, Latta and Hartmann introduced glass knives for microtomes as a substitute for the previously used steel knives; and knives made according to their concept are now commonly known as Latta-Hartmann knives. An example of such a knife is shown in FIG. 2 of U.S. Pat. No. 3,494,521 to Hellstrom. Such knives are usually fabricated by converting a plate of glass (which is usually ¼ inch but may be as much as ½ inch thick) into relatively small squares—with the squares typically having sides about one inch long. These squares are routinely fabricated in a laboratory by the person who expects to use them, using commercially available plate glass. That is, there is no commercial source of pre-fabricated glass knives—as far as is known. At least one reason for the absence of any successful marketing of pre-fabricated glass knives is their propensity to adsorb contaminants from the atmosphere. Indeed, merely leaving a glass knife in a typical biological laboratory for a few hours will cause it to adsorb sufficient contaminants from the air as to render it practically useless, primarily because the chore of cleaning a contaminated knife is so much more difficult than fabricating a new one. It will be understood, therefore, that glass knives have what may be called a relatively short "shelf life", and this has dictated that they be made only a short time before they are to be used in the laboratory.

Usually the glass squares for Latta-Hartmann knives are made by repeatedly scoring and then flexure-fracturing the glass plate; this is routinely accomplished with the aid of a hand-scorer and glazier's pliers. An individual glass square is then scored diagonally from corner to corner across one of the square's faces. The square is next fractured into two triangular pieces by flexing it in a direction perpendicular to the scored line. When the person preparing the knife is skilled in the art of making such knives, a sharp cutting edge is usually produced where the diagonal fracture surface intersects one edge of the glass block. The cutting surface of a Latta-Hartmann knife extends in the thickness direction of the glass block, and ideally is perpendicular to the face of the block.

Some persons are occasionally able to produce a cutting edge which is almost as long as the glass's thickness; but, with the hand-breaking methods of the prior art it is not uncommon for most people to produce a usable edge length that is only about one-fourth of the glass's thickness.

To obviate at least some of the deficiencies of the prior art, mechanical glass-breaking devices have been proposed from time to time; and, examples of such devices may be found in the following U.S. patents: U.S. Pat. No. 3,207,398 to Forsstrom and Persson; U.S. Pat. No. 3,371,833 to Sutton; U.S. Pat No. 3,819,096 to Pyper; and U.S. Pat. No. 3,908,878 to Blum. And, while these inventions may have eliminated some of the vagaries of hand-breaking glass knives, they have not been able to solve the inherent "problem" that characterizes Latta-Hartmann knives; the cutting edge is perpendicular to the planar surface of the glass plate—and its length therefore is dependent on the thickness of the glass. In view of the fact that there are practical limits on the thickness of glass plates and hence there are limits on the width (edge length) of Latta-Hartmann knives, it is not surprising that an effort was made to produce a different type of glass knife. In 1976, Dr. H. Stanley Bennet published in "Stain Technology" (Vol. 51, No. 2, Pages 71-97) a description of a method for manually fabricating a glass knife which is named for its originator, Dr. Paul Ralph. (A Ralph knife has its cutting edge in the plane of a glass plate's side—not its edge. Hence, in theory, the length of a glass knife of the Ralph type is limited only by the ability to manage a large piece of glass and achieve in it the controlled loading that is essential for a clean break.) Reportedly, Dr. Ralph made his knives some 40 years ago using what may be accurately described as an "impact" method. Regrettably, the "impact" method is said to have been characterized by a very low yield of satisfactory knives and a very large production of glass fragments.

Dr. Bennet improved the manual production of Ralph knives and taught that the knives could be made by fracturing a plate of glass by slowly applying hand pressure on opposite ends of a piece scored glass which was positioned over a wooden dowel. If a person enjoyed the luxury of an unlimited supply of glass and he had the patience to practice for many hours, it is conceivable that he could achieve a level of skill which at least approximated that of Dr. Bennet. However, for those persons who lack either a very large supply of glass or the determination to eventually succeed—no matter what the cost in time or materials, the technique described by Dr. Bennet is probably of limited value. It should be understood, therefore, that even after Bennet's article appeared, there has remained a need for a highly reliable means for preparing Ralph knives.

In my earlier filed and co-pending application Ser. No. 929,856, I disclosed an improvement over the technique of manually pressing a piece of glass over a wooden dowel. The glass knives made in accordance with my earlier disclosure were characterized by a very good profile, and a high percentage of usable knives were obtainable. I have now learned, however, that the profile of Ralph knives can be improved even more if a particular relationship is established between the rigid fulcrum and the glass piece; specifically, I have learned that the fulcrum should have a length which is just slightly shorter than the width of the glass piece. With this new apparatus, if the glass piece is centered with respect to an elongated fulcrum in such a way that there is an equal amount of unsupported glass beyond each end of the fulcrum, then the resulting knife edge is almost guaranteed to be more linear. Accordingly, it is an object of this invention to provide an apparatus which is an improvement over a previously known manual technique for making Ralph knives, and which is also an improvement over my previously disclosed apparatus.

Another object is to provide an apparatus with an improved alignment device which fosters the speedy and accurate positioning of a glass piece with respect to a rigid fulcrum.

Still another object is to provide a glass-breaking apparatus for making Ralph knives from glass pieces which may vary from nominal dimensions of 1 inch, 1¼ inch and 1½ inch in width.

These and other objects will be apparent from a reading of the specification and claims appended hereto, along with reference to the drawing in which:

FIG. 1 is a perspective view of a knife breaker made in accordance with the invention;

FIG. 2 is a partially sectioned elevational view of the apparatus taken in the plane represented by line 2—2 in FIG. 3.

FIG. 3 is a top plan view of the apparatus shown in FIG. 1;

FIG. 4 is a perspective view of one unitary fulcrum, showing a recess which fosters ease in properly locating a fulcrum on a base;

FIG. 5 is a front elevational view of a structural block which is used to properly center the glass pieces prior to the fracturing step;

FIG. 6 is a perspective view of the structural block showing the groove in the bottom thereof, and showing the slot which receives a bolt that is used to anchor the block to the base at a desired location; and FIG. 7 is a partial front elevation view of the glass-breaking apparatus, and showing the relative positions of several elements immediately after a piece of glass has been stressed to the point of fracture.

In brief, the invention includes a base having a generally horizontal surface with right and left ends. Upright structures are fixed to the respective ends of the base, and these structures have portions which extend forwardly in a cantilevered fashion over the upper surface of the base. A rigid fulcrum comprising a hardened and elongated member is positioned so as to lie between the two upright structures, usually in the center of the gap between those upright structures. A structural block having a width which is less than the gap between the two upright structures is mounted so that it may be selectively positioned with respect to the fulcrum. This structural block has a front face which is adapted to be contacted by the back edge of a rectangular piece of glass. By moving the structural block forward and backward, a piece of glass in contact therewith is also pushed backward and forward. Depending upon the width of a certain piece of glass and the length of a selected fulcrum, the structural block may be suitably positioned in order that an edge of the glass piece will extend beyond each end of the fulcrum, whereby each edge is unsupported when a fracturing force is applied to the glass.

Referring initially to FIGS. 1 and 2, the apparatus 10 includes an elongated base 12 which is preferably made of a rigid material such as a block of aluminum or stainless steel. The mass of the base is advantageously made large enough to offer some significant stability to the apparatus 10, but not so large as to render it inconvenient to move around. The base 12 has a generally horizontal upper surface 14, and right and left ends 16, 18. Right and left upright structures 20, 22 are fixed to respective ends of the base, as by bolts or the like. These upright structures 20, 22 serve as fixed portions of clamping devices or vises which are shaped so as to receive an elongated piece of glass through the open "mouth" of a C-shaped opening. Actually, each opening is established by an inverted L-shaped member which is securely fixed to the base 12 by a fastener which extends into the vertical leg of the "L". Thus, the structures 20, 22 each have an upper portion which extends forwardly in a cantilevered fashion over the upper surface 14 of the base. The right and left upright structures 20, 22 are also separated by a central gap which has a length of about 2.5 cm. Preferably, the confronting sides of the upright structures 20, 22 are planar, and they extend generally perpendicular to the longitudinal axis of the base 12.

In approximately the center of each horizontal portion 24, 26 of the upright structures is a threaded bore 28 into which is threadably inserted a respective bolt 30. On the upper end of each bolt 30 is secured a knurled knob 32, so that the bolt 30 may be manually turned at will. The threads on bolt 30 are preferably equivalent to 3/16-18 threads, in order that the bolt may be advanced in the bore 28 with some rapidity—but still with significant control—when the knob 32 is turned.

Affixed to the lower end of each bolt 30 is a flat pressure pad 34 which has a rectangular configuration that is similar to the cantilevered portions 24, 26 of the upright structures. In one satisfactory embodiment, a pressure pad 34 has a width of about 2.5 cm and a length of about 4 cm, thereby providing a pressure area of about 10 square centimeters. It is preferred that a pressure plate 34 have an area of at least 6 square cm for contacting the top surface of a piece of glass; and obtaining such a minimum area is much easier when its configuration is that of a square or rectangle—rather than a circle. A pressure area of less than 6 square cm could perhaps be made to work satisfactorily in a device of this type, but there is always the possiblity of introducing a deleterious stress concentration if the pressure plates are too small—which could contribute to an irregular breaking action. Each pad 34 is ideally affixed to the bottom end of its associated bolt 30 with a swivel-type joint, so that the pad has a substantial degree of "tilt" freedom with respect to the longitudinal axis of its bolt 30. However, it is preferred that the pressure pads 34 be at least somewhat restricted, for their own protection; so, the pads are given sufficient size as to be confined by adjacent structure to stay within a spatial envelope which is defined by the base 12.

Affixed to the lower surface of the pressure plates 34 are rubber pads 36 of neoprene rubber or the like, and similar mats or pads 38 are affixed to the top 14 of base 12. These lower mats 38 are positioned below the pads 36, and they provide a cushioned surface against which a freshly broken glass knife may fall.

A rigid fulcrum 40 comprising a hardened and elongated member is positioned so as to lie between the two upright structures 20, 22, as shown in FIG. 3. A convenient way of mounting this rigid fulcrum is to mill a cylindrical groove 42 in the upper surface 14 of the base, with said groove being a shallow but having a radius which is approximately the same as the radius of a piece of drill rod which is to serve as the fulcrum. Typical fulcra have diameters between about 4 to 6 mm, and lengths between about 19-32 mm; and they are preferably made of a single piece of smooth and hardened steel. To position any of a plurality of fulcra 40 correctly in the long groove 42, a small vertical pin 43 may be advantageously placed so that it protrudes upwardly from the bottom of the groove at a spot which is on a transverse line between the two bolts 30. A central notch or recess 41 is then machined into the bottom of each fulcrum, with each such notch having a size to snugly engage the pin 43 and thereby center the fulcrum with respect to the two pressure pads 34. With such a construction, any selected fulcrum 40 will always be correctly oriented with respect to the base 12, and a small quantity of adhesive may be easily used to hold the fulcrum in the prepared groove. (The groove 42 resists any vertical and sideward loads on the fulcrum, so the adhesive does relatively little in holding the fulcrum firmly during breaking of a glass knife.) Of course, to insure that a resultant knife edge will be perpendicular to the long edge of a piece of glass, the groove 42 should be positioned so that it lies in a vertical plane between the two structures 20, 22, with said vertical plane being perpendicular to the receiving area for a rectangular piece of glass.

A means for positioning a piece of glass is provided in the form of a structure block 50; the block has a width which is less than the gap between the two upright structures 20, 22 such that the block may be selectively positioned anywhere between the two upright structures. The block 50 has a front face 52 which is oriented so as to be perpendicular to the longitudinal axis of the rigid fulcrum 40. This front face 52 is adapted to be contacted by the interior edge of a rectangular piece of glass plate, which will be hereinafter referred to as the "rear" edge of the glass. The block 50 is selectively movable so as to change the relative spacing between a piece of glass (which is in contact with the block) and the center of said fulcrum 40. Thus, when the structural block 50 is moved forward, a glass piece G will be pushed forward and its position with respect to a fixed fulcrum will be altered. When the block 50 is temporarily loosened and moved backward, a glass piece G may be manually pushed to the rear (against front face 52) to again change the relative position between the glass and the fixed fulcrum.

One reason for wishing to adjust the position of block 50 with respect to the fulcrum 40 is that it has been discovered that improved microtome knives can be achieved when the front and rear edges of the glass pieces are unsupported for at least 3 mm at the time that fracturing forces are applied to the glass. Therefore, depending upon the width of the glass piece which is to be broken, the structural block 50 is ideally positioned so that the glass piece G will be at least approximately centered with respect to the unitary fulcrum 40. That is, there will be about the same overhang (or unsupported length) at both edges of the glass piece G. And, when it is desired to switch from one-inch glass strips to 1¼ inch of 1½ inch strips, the structural block 50 may be readily moved. Also, it is possible to change from one size fulcrum to another, simply by breaking any adhesive connection to the groove 42 and lifting out the old fulcrum; a replacement fulcrum is automatically positioned correctly by the mating of a pin 43 in a notch 41, regardless of whether the new fulcrum has a different diameter or a different length.

To insure that the structural block 50 can be restrained against sideward movement or twisting while still having substantial freedom to move in a direction parallel to the longitudinal axis of the fulcrum, a longitudinal groove 54 is provided in the bottom of the block 50 (FIGS. 5 & 6). The groove 54 is sized to mate with an elongated and elevated guide 56 which is securely affixed to the upper surface 14. A suitable guide 56 is a cylindrical pin which is mounted on the upper surface 14 so as to be parallel to said surface and perpendicular to frontal face 52. Such a pin 56 preferably rests in a groove in the surface 14, with the pin extending partially below and partially above the plane of said surface 14. For manufacturing economy, the groove which holds the elevated guide 56 may constitute a longitudinal extension of the groove 42 which locates and holds a selected fulcrum 40. Hence, a groove 42 about 2 mm deep and 80 mm long can serve a double purpose in locating a fixed fulcrum and controlling the position of a movable block 50. It should perhaps be noted also that the disclosed arrangement of a cooperating groove and elevated guide could be reversed, with the elevated guide (e.g., cylinder 56) being fixed to the block 50 instead of the base 12; either arrangement would achieve the same result in controlling movement of the structural block.

Because it does seem desirable to be able to move the structural block 50 from time to time, it is therefore appropriate for the block 50 to be fixed to the base 12 with only a manually tightenable fastener, such as a bolt 58 with knurled head. To receive such a bolt 58, a vertical slot 57 (FIG. 6) is provided in the structural block 50, so that the block may be positioned at any of a substantially infinite number of locations with respect to the base 12.

Provided on the frontal face 52 of the structural block 50 is at least one vertical index line 60, and preferably a plurality of parallel index lines—each of which is separated by a distance of at least 1½ millimeters. In the embodiment shown in FIG. 5, three such index lines 60A, 60B and 60C are shown. The index lines 60 ideally have a length so that they extend above the top surface of a piece of glass which is to be broken; and, since that glass may vary in thickness from piece to piece, it is most expedient to simply provide a line about 1 cm long (from the top of the block to the bottom thereof). In use, the index lines 60 serve as a guide for the manual placement of a piece of glass G so that a score line on top of the glass is positioned parallel to and suitably offset with respect to the longitudinal axis of the fulcrum 40. And, when more than one index line is provided on the face 52, it is possible to achieve precise placement of a glass piece in order to obtain the desired profile in a glass knife. It should perhaps be emphasized, also, that the vertical index lines 60 are exposed in such a way that they can be made to intersect a score line on top of a piece of glass. Therefore, regardless of where the operator may be sitting or standing with respect to the apparatus 10, he will be able to achieve accurate positioning of any glass piece. In other words, there is no alignment difficulty caused by parallax or the like when a person is working to arrange two lines so that they intersect one another at an angle of 90 degrees.

In use of the apparatus 10, a person will typically obtain a piece of quarter inch glass plate and break it into strips of a desired width, typically 1 inch, 1¼ inches or 1½ inches wide. Next, a score line is placed transversely on a given one of the narrow strips, on the surface which will thereafter be understood to be the top. A suitable scoring apparatus is disclosed in the previously mentioned application Ser. No. 929,856. The scored glass piece is then placed in the apparatus 10 with its bottom surface in contact with the fulcrum 40 and its top surface in contact with the two spaced rubber pads 36. Bolt 58 is then loosened so that the structural block 50 may be moved to a position such that the glass piece (which is in contact with frontal face 52) will be centered above the rigid fulcrum. By centering the glass piece with respect to the fulcrum, the glass is therefore centered with respect to the two pressure plates 34—so that any strain introduced by turning a knob 32 will be imparted to the glass in a balanced and uniform manner.

With the glass piece G in position, a final check should be made to verify that at least some of the glass extends beyond the two week ends of the rigid fulcrum 40. As explained hereinbove, such an overhang should be at least three millimeters at each edge, but preferably no more than about 4.5 mm. That is, if the glass overhang is too great, there will be a possibility of too much unsupported glass—which may contribute to irregularities such as serrations in the knife edge. If a measurement reveals that the overhang distance is not within the desired range, one of the bolts 30 would typically be slightly backed off to free the piece of glass so that it can be removed from its position adjacent the two posts 20, 22; then, a fulcrum having an appropriate length would be substituted for the original fulcrum. The procedure of mounting the glass piece in the apparatus 10 would then be repeated, and the horizontal score line on the glass would be aligned with a selected one of the vertical index lines 60. The index line which is closest to the fulcrum 40 is about 5 mm away, and the next index line is about 6.5 mm away; each additional index line is about 1.5 mm further away from the longitudinal axis of the fulcrum. (Depending upon the quality of the glass and its thickness, etc., the user may determine from a few trials that alignment of the score line with a given one of the index lines 60 produces the right kind of fracture in the glass and the best possible profile in the knife edge E.) When a knob 32 is tightened sufficiently, the glass piece will be strained to the point that it will fracture—beginning at the score line and traveling downward and generally toward the fulcrum—as shown in FIG. 7.

Experience has shown that an optimum ratio between the length of the supporting fulcrum and the width of the glass piece should be about 3:4. Hence, when the glass knife is to be one inch (25 mm) long, the fulcrum should be about 19 mm long. For 1½ inch (38 mm) glass, the fulcrum should ideally be about 29 mm long. Such fulcra will provide an unsupported length of about ¼ of the glass strip, with ⅛ of the glass width being unsupported at each end of fulcrum. If the length of a fulcrum is too short with respect to the glass strip, a sharp edge E may still be obtained in the glass knife, but it usually will not be as straight (from one end of the edge E to the other end). Other irregularities which may sometimes arise are serrations, bowing of an edge, or a blunt profile.

While only the preferred embodiment (and a few modifications thereof) have been disclosed in great detail herein, it should be apparent to those skilled in the art that still additional modifications could be made without departing from the spirit of the invention. Accordingly, the invention should be understood to be as broad as the scope of the claims appended hereto.

What is claimed is:

1. A glass-breaking apparatus adapted for breaking microtome knives of the Ralph type, comprising:
    (a) a base having a generally horizontal upper surface, and having right and left portions;
    (b) right and left upright structures fixed to the right and left portions of the base, and the upright structures having portions which extend in a cantilevered fashion over the upper surface of the base, and said right and left upright structures having a central gap therebetween;
    (c) a rigid fulcrum comprising a hardened and elongated member which is fixed so as to lie between the two upright structures and in a vertical plane being perpendicular to a receiving area for rectangular glass pieces, and the length of the fulcrum being appreciably less than the length of said cantilevered portions of the upright structures, whereby a piece of glass which is wider than said fulcrum may be selectively positioned over said fulcrum and under said cantilevered portions;
    (d) structural means having a planar face against which a piece of scored glass can be pushed so as to be positioned over the fixed fulcrum and centered with respect to the fulcrum as measured in a front-to-rear direction, and said structural means being selectively movable in order that glass pieces of variable width may be positioned such that equal amounts of glass extend beyond both ends of the fulcrum; and
    (e) means associated with the right and left upright structures for forcing a piece of glass to be fractured along a line generally parallel to the fulcrum.

2. The glass-breaking apparatus as claimed in claim 1 wherein the structural means for positioning a piece of glass constitutes a structural block with a frontal face having a height of about 1 cm, and further including at least one vertical index line on said frontal face, and said at least one index line being offset with respect to the longitudinal axis of the rigid fulcrum, whereby a microtome knife may be fabricated by aligning a prepared score line on top of the piece of glass with said index line prior to fracturing the glass.

3. The glass-breaking apparatus as claimed in claim 1 and further including a plurality of parallel index lines on the frontal face of said structural means for positioning a piece of glass, with said index lines being vertical and separated by at least 1½ millimeters, whereby a piece of glass may be manually positioned adjacent a selected one of the plurality of index lines prior to breaking said glass.

4. The glass-breaking apparatus as claimed in claim 1 and further including means for restraining said structural means in a sideward direction while permitting substantial movement in a direction parallel to the longitudinal axis of the rigid fulcrum, with said means constituting a single groove and a matching elevated guide, with the groove being provided on the structural means and the elevated guide being on the upper surface of said base, and wherein the elevated guide constitutes a cylindrical pin which is fixed to a groove in the upper surface of said base, with the cylindrical pin extending partially below and partially above the plane of said base's upper surface.

5. The glass-breaking apparatus as claimed in claim 4 wherein said groove for holding the cylindrical pin constitutes an extension of a groove which locates and holds said rigid fulcrum.

6. The glass-breaking apparatus as claimed in claim 1 wherein the structural means for positioning a piece of glass constitutes a structural block having a width less than the gap between said two upright structures, such that the block may be positioned between the two upright structures, and said block having a front face which is perpendicular to the longitudinal axis of the rigid fulcrum and adapted to be contacted by the back edge of a rectangular piece of glass, and said block being selectively movable so as to change the relative spacing between a piece of glass that is in contact with the block and the center of said fulcrum, whereby the structural block may be selectively moved in order to position the glass centrally over the fulcrum in anticipation of fracturing said glass.

7. The glass-breaking apparatus as claimed in claim 1 wherein the rigid fulcrum is selectively removable and replaceable at will with a different-sized fulcrum, and wherein the replaceable fulcra include those of varied diameter as well as varied length.

8. The glass-breaking apparatus as claimed in claim 1 wherein said means for forcing a piece of glass to be fractured includes two horizontally spaced pressure pads, and further including means for centering respective ones of a plurality of installed fulcra so that each fulcrum is centered on a line that extends between the centers of the two spaced pressure pads.

9. The glass-breaking apparatus as claimed in claim 1 and further including a small vertical pin extending upwardly from the base in the region between the two upright structures, and the rigid fulcrum having a recess in the bottom thereof which matches the size of the vertical pin, whereby the fulcrum may be removed and replaced on the base by engaging the mating pin and recess.

10. The method of preparing a Ralph-type microtome knife, comprising the steps of:
 (a) placing a straight score line on the top surface of a piece of glass plate having a given width;
 (b) positioning the glass piece with its bottom surface in contact with a narrow and rigid member which is adapted to serve as a fixed fulcrum, with the score line being positioned parallel to the fulcrum and separated therefrom by a certain distance, and the length of said rigid fulcrum being less than the width of said piece of glass, and said piece of glass being positioned so that a line through its center is directly above the center of the rigid fulcrum, such that equal portions of the glass piece extend beyond the rigid fulcrum in a direction parallel to the longitudinal axis of said fulcrum, and whereby the outer edges of the glass piece will be unsupported when a breaking force is applied to said glass piece; and
 (c) straining the glass piece by forcing the ends of the glass piece in a direction so as to cause it to fracture along the score line.

11. The method of preparing a microtome knife as claimed in claim 10 wherein the rigid fulcrum has a length which is about $\frac{3}{4}$ of the width of the glass piece, whereby the edges of the glass piece are unsupported for about $\frac{1}{8}$ of their length in the regions beyond the fulcrum's two ends.

12. The method of preparing a microtome knife as claimed in claim 10 wherein the rigid fulcrum constitutes a cylindrical member having a diameter of about 5 mm and a length within the range of about 19–29 mm, and said fulcrum is fixed to the base in such a position that glass pieces having a width of 25 mm, 32 mm or 38 mm may be selectively centered over an appropriate rigid fulcrum prior to said fracturing step.

13. The method of preparing a microtome knife as claimed in claim 10 wherein a score line on the top surface of a horizontal piece of glass is manually aligned with a vertical index line at the edge of said piece of glass, whereby alignment may be accomplished by visually establishing the intersection of two lines, one of which is vertical and the other being horizontal, such that parallex problems in alignment are obviated.

* * * * *

UNITED STATES PATENT OFFICE
CERTIFICATE OF CORRECTION

Patent No. 4,231,503   Dated November 4, 1980

Inventor(s) James K. Butler

It is certified that error appears in the above-identified patent and that said Letters Patent are hereby corrected as shown below:

Column 2, line 31, the word --of-- should be inserted after "piece".
Column 5, line 15, the word "structure" should read --structural--.
Column 5, line 48, the word "of" should read --or--. Column 7, line 5, the word "week" should be omitted. Column 8, line 4, the words --between said two structures, with said vertical plane-- should be inserted before "being".

Signed and Sealed this

Thirteenth Day of January 1981

[SEAL]

Attest:

Attesting Officer

SIDNEY A. DIAMOND

Commissioner of Patents and Trademarks